Figure 1:
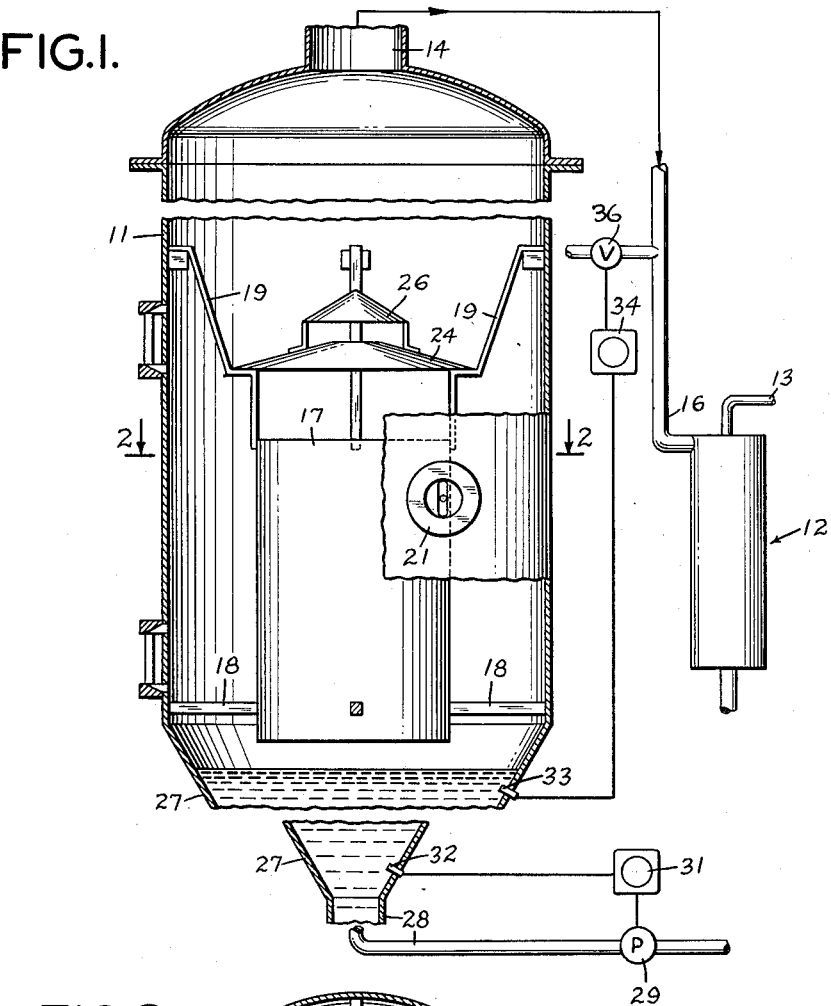

March 28, 1961  W. H. BRADSHAW ET AL  2,977,355
ALKALI CELLULOSE AGING

Filed Jan. 13, 1954  2 Sheets-Sheet 1

INVENTORS.
WILLIAM H. BRADSHAW
EDWARD H. SHAW
ATTORNEYS.

March 28, 1961 W. H. BRADSHAW ET AL 2,977,355
ALKALI CELLULOSE AGING
Filed Jan. 13, 1954 2 Sheets-Sheet 2
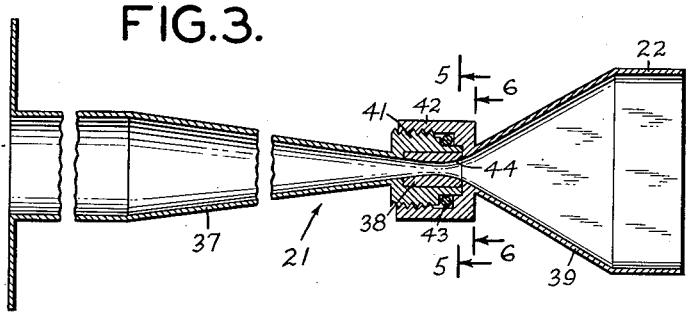
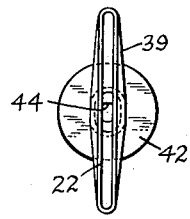
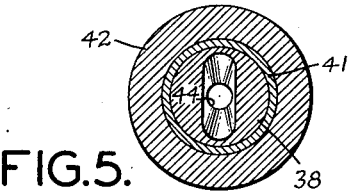
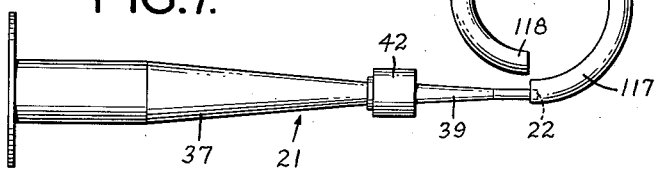
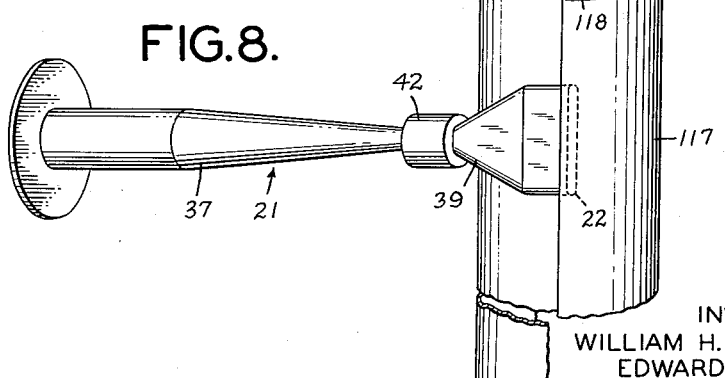
INVENTORS.
WILLIAM H. BRADSHAW
EDWARD H. SHAW
BY
ATTORNEYS.

United States Patent Office
2,977,355
Patented Mar. 28, 1961

2,977,355

ALKALI CELLULOSE AGING

William H. Bradshaw, New Rochelle, N.Y., and Edward H. Shaw, Rome, Ga., assignors to Celanese Corporation of America, New York, N.Y., a corporation of Delaware Filed Jan. 13, 1954, Ser. No. 403,750

13 Claims. (Cl. 260—233)

This invention relates to the treatment of gasified liquids and relates more particularly to the treatment of an aged slurry of alkali cellulose in aqueous alkali containing bubbles of gas dispersed therein.

In the manufacture of viscose it is customary to steep sheets of cellulose pulp in an aqueous caustic solution in order to form alkali cellulose and to remove hemicellulose and other impurities from the pulp. Following the steeping operation the pulp is pressed to remove excess caustic solution and the pressed pulp is mechanically disintegrated or shredded to form a mass of fibers resembling bread crumbs. These alkali cellulose crumbs are placed in a covered container and allowed to "age," usually for 1 to 3 days. During the aging step absorption of oxygen occurs and the degree of polymerization of the alkali cellulose decreases. The aged alkali cellulose is then xanthated, i.e. reacted with carbon disulfide to form sodium cellulose xanthate, and dissolved in aqueous caustic to form viscose.

A novel method for the continuous aging of alkali cellulose has been described in the copending application of Bradshaw, Lynch and Shaw, Serial No. 403,907, filed on even date herewith, and now Patent No. 2,858,304, and the copending application of Bradshaw, James and Shaw, Serial No. 403,788, filed on even date herewith. Generally speaking, in this novel method cellulose pulp is mixed with aqueous alkali and the resulting slurry is then mixed continuously with an oxygen-containing gas, such as air or oxygen, and subjected to violent agitation to produce a uniform dispersion of small bubbles of the gas in the slurry. Desirably, this gaseous dispersion, or gasified slurry, is formed in the presence of an emulsifying agent, best results being obtained when the emulsifying agent is a sodium salt of a sulfated fatty acid, e.g. of sulfated oleic acid, such as the material sold under the name "Prestabit Oil V-New." The stream of gasified slurry is led directly into an aging tank where it is divided into successive small batches which are moved through the aging tank without substantial intermingling of said batches. The slurry remains in the aging tank for an appreciable period of time, e.g. 30 minutes, and is maintained at an elevated temperature, such as 45 to 75° C., preferably about 65° C., during this aging period. The aged slurry is discharged from the aging tank in the form of a relatively viscous continuous stream, still containing numerous small bubbles of gas relatively stably dispersed therein. For example, in one embodiment the gas bubbles constitute 22% of the volume of the slurry discharged from the aging tank.

It is an object of this invention to provide a novel process and apparatus for the treatment of the aged gasified slurry discharged from the aging tank.

A further object of this invention is the provision of a new, efficient and economical process and apparatus for the treatment of an aged gasified slurry of alkali cellulose to halt the aging process in said slurry by cooling said slurry and removing the bubbles of gas contained therein.

Still another object of this invention is to provide a novel process and apparatus for the treatment of gasified liquids.

Other objects of this invention will be apparent from the following detailed description and claims.

According to this invention a stream of the aged gasified slurry is injected into a tank maintained at a reduced pressure and the injected stream is directed in a curved path whereby there is developed in said stream a centrifugal force, which force aids in the removal of the gas bubbles therefrom.

Figure 2:
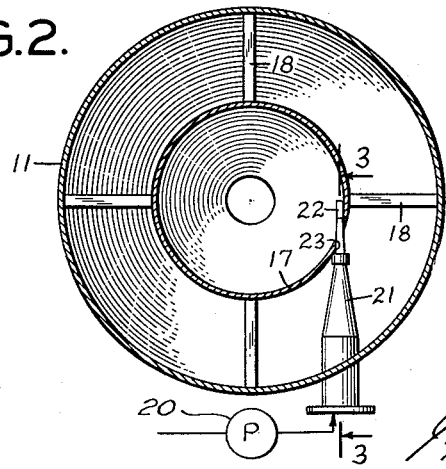

One embodiment of the invention is illustrated in the accompanying drawings wherein Fig. 1 is a side view showing the tank in cross-section and showing the controls for the tank diagrammatically, Fig. 2 is a cross-sectional view along the line 2—2 of Fig. 1, Fig. 3 is a cross-sectional view along the line 3—3 of Fig. 2, showing the construction of an injection nozzle, Fig. 4 is an end view of the nozzle shown in Fig. 3, Fig. 5 is a cross-sectional view along the line 5—5 of Fig. 3, Fig. 6 is a cross-sectional view along the line 6—6 of Fig. 3, Fig. 7 is a plan view of the nozzle and a modified form of a flash tube for use in the tank, and Fig. 8 is a perspective view of the nozzle and the modified form of flash tube.

Referring now to the drawings, reference numeral 11 designates a tank, circular in cross-section, whose interior is maintained under a subatmospheric pressure by a suitable vacuum pump, such as a steam jet evacuator 12 (shown diagrammatically). The evacuator 12, which is supplied with steam through a line 13, acts to remove gases and vapors from the top of the tank 11 through an outlet 14 communicating with a pipe 16 leading to said evacuator. Within the tank 11 there is provided an open circular cylindrical flash tube 17 which is supported by means of spaced arms 18 and straps 19 attached to the walls of the tank.

A heated aged gasified slurry of alkali cellulose containing numerous bubbles of gas, is fed, by means of a pump 20 (Fig. 2), continuously at a constant rate from outside the tank 11 into the interior of the flash tube 17 through a nozzle 21. The tip 22 (Fig. 2) of the nozzle 21 passes through an aperture 23 in the wall of the flash tube 17 and is arranged to discharge the gasified slurry tangentially along the inner surface of said tube 17. The gasified slurry leaves the tip 22 at a high velocity and in a generally horizontal direction and travels downwardly, due to the effect of gravity, in a thin layer in a spiral or helical path around the inner surface of the flash tube 17. During this movement of the stream of slurry the effect of centrifugal force on the liquid and gaseous phases thereof causes a separation of the gas bubbles in a direction towards the inner surface of said stream, i.e. the surface nearer the center of the flash tube. The centrifugal force also acts to decrease the thickness of the stream of liquid, causing it to flatten out against the inner surface of the flash tube 17. At the same time rapid evaporation, or flashing, of water from the slurry takes place, since the temperature of the entering slurry is above the boiling point of the slurry at the low pressure prevailing in the tank. At this low pressure the bubbles of gas expand and water evaporates rapidly into the expanded bubbles, causing them to increase in size. Due to the combined effects of centrifugal force and of the reduced pressure, the gas is removed substantially completely from the slurry, together with a portion of the water. The rapid evaporation of water also acts to cool the slurry. Because of the rapid removal of gas and the cooling of the slurry, there is a correspondingly rapid reduction in the rate of aging, i.e. in the rate of depolymerization of the alkali cellulose in said slurry.

The gas and water vapor given off from the stream of slurry pass upward through the open top of the flash tube 17, past an open frusto-conical sheet metal baffle 24 and a conical sheet metal baffle 26, and then out through the opening 14 to the evacuator 12. The baffles 24 and 26, both of which are supported by the straps 19, serve to remove any entrained liquid from the upwardly flowing gas and vapor.

The degassed slurry, which has been cooled by the evaporation of part of its water, drops down from the flash tube 17 and collects in a pool in the conical bottom portion 27 of the tank 11, the level of said pool of slurry being maintained below the bottom of the flash tube 17. If desired, there may be provided means for agitating said pool. The collected degassed slurry is metered out through the bottom of the tank 11 and through a pipe 28 by means of a pump 29 whose speed is controlled, in a well known manner, to maintain a relatively constant level in the conical bottom portion. Thus the speed of the pump 29 may be regulated by a suitable automatic controller 31 and pressure responsive element 32, the latter being mounted in the lower part of the conical portion 27 of the tank.

In addition, the apparatus of this invention is so controlled as to cool the slurry continuously to a substantially constant temperature. To this end there is provided a temperature responsive element 33 projecting into the conical bottom portion 27 below the upper level of the collected slurry, which temperature responsive element is connected through a conventional automatic controller 34 to a valve 36. The valve 36 regulates the admission of air from the atmosphere to the pipe 16 leading to the evacuator 12. When the temperature of the collected slurry varies from the desired value, the controller 34 acts to regulate the valve 36 to change the pressure in the tank. For example, when the temperature of the collected slurry is too low, too much evaporation has taken place in the tank 12 and the controller 34 accordingly opens the valve 36 to a greater extent, thus increasing the pressure in the tank and thereby decreasing the amount of evaporation. The opposite effect is produced when the temperature of the collected slurry is too high. The pressure in the tank 11 should be maintained at a value at least as low as the equilibrium vapor pressure of water from the slurry at the desired final slurry temperature, which is, for example, about 45° C.

The nozzle 21 is designed to discharge the gasified slurry in a thin, relatively flat stream at a high velocity along the inner surface of the flash tube 17. More particularly, the nozzle 21 is of the converging-diverging type and is composed of a converging member 37 (Fig. 3), an intermediate throat member 38, and a diverging member 39. The converging member 37 is provided with an integral threaded annular collar 41 adapted to be screwed into an integral threaded socket 42 of the diverging member 39, while the intermediate member 38 is adapted to fit within the annular collar 41 and to be held in place by engagement with the socket 42 when said collar and socket are screwed together. The whole assembly is sealed by an O-ring 43.

The converging member 37 is of circular cross-section throughout its length, while the cross-section of the diverging member 39 is oval, or flattened, its width remaining substantially the same, and even decreasing at the tip 22, while its height increases progressively to a value which is several times its width, as shown in Figs. 3, 4, 5 and 6. The intermediate member 38 is provided with a converging-diverging passage 44, which passage is so designed as to provide a transition between the circular converging member 37 and the oval diverging member 39. Thus, the passage 44 is circular in cross-section in its left portion, as viewed in Fig. 3, but becomes oval, or flattened, in cross-section in its right-hand portion, where the height of the passage increases considerably while its width increases only slightly, as shown in Fig. 5.

If desired, the nozzle may have only a converging portion, of oval cross-section, without any diverging portion. However, when a nozzle having only a converging portion is employed, it is not possible to impart to the stream discharged from said nozzle a velocity as high as that attainable by means of a nozzle having both converging and diverging portions. Further, when a nozzle having only a converging portion is used, the pressure at the tip of the nozzle is relatively high and there is necessarily a considerable expansion of the gasified slurry after it leaves the tip of the nozzle. Such expansion is undesirable in that it tends to cause splattering and turbulence immediately after injection, thus leading to entrainment of liquid in the gases removed from the tank and, at times, to cascading of the slurry into the bottom of the tank. In contrast, a converging-diverging nozzle provides for a smooth expansion of the bubbles of gas in the slurry within the diverging portion of said nozzle and there is much less splattering and turbulence of the stream of gasified slurry leaving said nozzle. In addition, when the converging-diverging nozzle is used the stream of gasified slurry can be injected from the nozzle at very high velocities, i.e. velocities greater than the speed of sound in said slurry. Such supersonic velocities cannot be attained by the use of a simple converging nozzle. Accordingly, since the centrifugal force is a function of the velocity, the centrifugal force acting on the stream of slurry as it moves around the inside of the flash tube 17 will be much higher when a converging-diverging nozzle is used, thus greatly accelerating the removal of the gas bubbles from said slurry.

In the modification illustrated in Figs. 7 and 8, the cross section of the modified flash tube 117 is not circular but rather in the form of an open involute curve. This shape prevents the stream of slurry whirling in the flash tube 117 from overlapping the stream of incoming slurry entering from the tip 22. In addition the flash tube 117 is provided with an upper lip 118 to prevent incoming slurry from shooting over the top of said tube, while the lower portion 119 of the flash tube is curved inwardly to help prevent the slurry from spraying radially from the bottom of said tube.

As stated, the process and apparatus for making the aged gasified slurry are disclosed in the three copending applications mentioned above. In the making of this slurry the aqueous alkali used is advantageously a solution of sodium hydroxide of mercerizing strength and having a concentration of about 7 to 30%, preferably about 18½%, while the amount of pulp added is preferably sufficient to yield a mixture containing about 2 to 6 or 10%, preferably about 3 to 4 or 5%, of cellulose. The emulsifying agent is usually employed in a concentration of about ⅛% to 2%, preferably about ½%, based on the weight of the cellulose. The bubbles of gas in the gasified aged slurry are generally less than 120 microns in diameter, most of them being smaller than 60 microns in diameter, and the gas in said aged slurry usually constitutes about 15 to 30% of the total volume of the slurry.

After the aged slurry has been cooled and degassed in the tank 11, it is advantageously squeezed continuously, in a press, to separate the excess liquid from the fibers of alkali cellulose, following which the separated aggregates of alkali cellulose are shreaded continuously and the resulting crumbs are cooled further, preparatory to the manufacture of viscose therefrom.

It is to be understood that the foregoing detailed description is given merely by way of illustration and that many variations may be made therein without departing from the spirit of our invention.

Having described our invention, what we desire to secure by Letters Patent is:

1. Process for the treatment of heated aged slurry of alkali cellulose in aqueous alkali containing stably dispersed bubbles of gas, said process comprising directing a stream of said heated aged gasified slurry in a curved path into an evaporative zone whereby said gasified slurry is subjected to the action of centrifugal force and evaporation to remove bubbles therefrom.

2. Process for the treatment of heated aged slurry of alkali cellulose in aqueous alkali containing an emulsifying agent and stably dispersed bubbles of gas, said process comprising directing a stream of said heated aged gasified slurry in a curved path into an evaporative zone maintained at a subatmospheric pressure below the vapor pressure of the water in said heated slurry whereby said gasified slurry is subjected to the action of centrifugal force and rapid evaporation to remove said gas bubbles therefrom.

3. Process for continuously substantially halting the aging process in a heated slurry of aged alkali cellulose, said process comprising injecting a heated slurry of aged alkali cellulose in aqueous alkali containing an emulsifying agent and dispersed bubbles of an oxygen-containing gas into a zone maintained at a subatmospheric pressure lower than the vapor pressure of the water in said slurry, said slurry being injected in the form of a stream directed along a concave surface in said zone so that said stream is caused to flow in a thin layer and in an arcuate path along said surface and said gasified slurry is subjected to centrifugal force and to said subatmospheric pressure whereby said gas bubbles are substantially removed therefrom and said slurry is cooled by the evaporation of water therefrom at said subatmospheric pressure.

4. Process for continuously substantially halting the aging process in a heated slurry of aged alkali cellulose, said process comprising injecting a heated slurry of aged alkali cellulose in aqueous alkali containing an emulsifying agent and dispersed bubbles of an oxygen-containing gas into a zone maintained at a subatmospheric pressure lower than the vapor pressure of the water in said slurry, said slurry being injected in the form of a stream directed along a concave surface in said zone so that said stream is caused to flow in a thin layer and in an arcuate path along said surface and said gasified slurry is subjected to centrifugal force and to said subatmospheric pressure whereby said gas bubbles are substantially removed therefrom and said slurry is cooled by the evaporation of water therefrom at said subatmospheric pressure, said slurry being injected into said zone through a nozzle having a converging portion and a diverging portion, with the outlet of said diverging portion adjacent to said concave surface, said diverging portion serving to increase the velocity of the stream leaving said nozzle whereby the centrifugal force acting on said stream is increased so that said gas will be removed therefrom at an increased rate, said diverging portion also serving to permit said bubbles of gas to expand therein and causing said stream to be discharged more smoothly and with much less splattering whereby to reduced susbtantially the amount of liquid entrained in the gas leaving said tank.

5. Apparatus for degassing a liquid, said apparatus comprising a tank, means for removing gases from said tank and for maintaining a reduced subatmospheric pressure therein, means for supplying a liquid containing bubbles of gas dispersed therein and for injecting said liquid into said tank in the form of a stream, a deflector having a concave deflecting surface in said tank and said injecting means comprising a nozzle, flattened parallel to said surface, for introducing a stream of said liquid along said surface as a thin layer thereon.

6. Apparatus for degassing a liquid, said apparatus comprising a tank, means for removing gases from said tank and for maintaining a reduced subatmospheric pressure therein, means for supplying a liquid containing bubbles of gas dispersed therein and for injecting said liquid into said tank in the form of a stream, a deflector comprising a flash tube in said tank and having a concave inner surface, said injection means comprising a nozzle for directing said stream along said inner surface.

7. Apparatus as set forth in claim 6, said flash tube being mounted vertically in said tank and above the bottom of said tank, said nozzle being arranged to inject said stream horizontally and tangentially to said surface, said apparatus comprising also means for collecting the degassed slurry at the bottom of the tank and means for maintaining the upper level of the collected slurry below the bottom of said flash tube.

8. Apparatus for degassing a liquid, comprising a tank, means for removing gases from said tank and for maintaining a reduced pressure therein, means for subjecting a gasified liquid to centrifugal force in said tank by moving a stream of said liquid in an arcuate path, said last-named means comprising a curved deflector in said tank and a nozzle having converging and diverging portions for injecting a stream of said gasified liquid along said deflector.

9. Apparatus for degassing a liquid, comprising a tank, means for removing gases from said tank and for maintaining a reduced pressure therein, means for subjecting a gasified liquid to centrifugal force in said tank by moving a stream of said liquid in an arcuate path, said last-named means comprising a curved deflector in said tank and a nozzle having converging and diverging portions for injecting a stream of said gasified liquid along said deflector, said diverging portion being flattened parallel to the surface of said deflector for introducing the stream of said gasified liquid to form a thin layer thereof on said deflector.

10. Apparatus for degassing a liquid, said apparatus comprising a tank, means for removing gases from said tank and for maintaining a reduced, subatmospheric, pressure therein, a circular flash tube in said tank, means for supplying a liquid containing bubbles of gas, a nozzle for injecting said liquid into said tank in the form of a stream directed along the inner surface of said flash tube whereby said stream is caused to flow in an arcuate path and said gasified liquid is subjected to centrifugal force to aid in the removal of gas bubbles therefrom.

11. Apparatus for degassing a liquid, said apparatus comprising a tank, means for removing gases from said tank, a flash tube of involute cross-section mounted vertically in said tank, said tube having an inwardly turned upper lip and a lower inwardly curved portion, a nozzle for injecting a gasified liquid into said tank in the form of a stream directed along the inner surface of said flash tube whereby said stream is caused to flow in an arcuate path and said gasified liquid is subjected to centrifugal force to aid in the removal of gas bubbles therefrom.

12. Apparatus for degassing a liquid, said apparatus comprising a tank, a pump for removing gases from said tank and for maintaining a reduced, subatmospheric, pressure therein, means for supplying a heated liquid containing bubbles of gas dispersed therein and for injecting said liquid into said tank in the form of a stream, means for deflecting said stream to cause said stream to flow in an arcuate path while said stream is under said reduced pressure, whereby said gasified liquid is subjected to centrifugal force to aid in the removal of gas bubbles therefrom and is cooled by evaporation of said liquid under said reduced pressure, means for collecting the resulting degassed liquid, and means for controlling the reduced pressure produced by said pump in response to the temperature of the collected degassed liquid.

13. Apparatus for continuously substantially halting the aging process in a slurry of aged alkali cellulose in aqueous alkali, which slurry contains an emulsifying agent and dispersed bubbles of an oxygen-containing gas, said apparatus comprising a tank, means for removing gases from said tank and for maintaining a subatmospheric pressure therein, means providing a concave deflecting surface in said tank, a nozzle for injecting said gasified slurry into said tank in the form of a stream directed along said concave surface whereby said stream is caused to flow in an arcuate path and said gasified slurry is subjected to centrifugal force and to said subatmospheric pressure to aid in the removal of gas bubbles therefrom and said slurry is cooled by the evaporation of water therefrom at said subatmospheric pressure, said nozzle having a converging portion and a diverging portion, with the outlet of said diverging portion adjacent to said concave surface, said diverging portion serving to increase the velocity of the stream leaving said nozzle whereby the centrifugal force acting on said stream is increased so that said gas will be removed therefrom at an increased rate, said diverging portion also serving to permit said bubbles of gas to expand therein and causing said stream to be discharged more smoothly and with much less splattering whereby to reduced substantially the amount of liquid entrained in the gas leaving said tank, and means for supplying said gasified slurry to said nozzle.

References Cited in the file of this patent

UNITED STATES PATENTS

| | | |
|---|---|---|
| 577,362 | Ettlinger | Feb. 16, 1897 |
| 1,238,672 | Hopwood | Aug. 28, 1917 |
| 1,440,808 | Wineman | Jan. 2, 1923 |
| 1,553,973 | Ballou | Sept. 15, 1925 |
| 1,831,586 | Barr | Nov. 10, 1931 |
| 2,166,300 | Komar | July 18, 1939 |
| 2,343,317 | Olson | Mar. 7, 1944 |
| 2,355,057 | Copeland | Aug. 8, 1944 |
| 2,434,596 | Spieth | Jan. 13, 1948 |
| 2,494,427 | Bidwell et al. | Jan. 10, 1950 |
| 2,542,492 | Entwistle et al. | Feb. 20, 1951 |
| 2,592,355 | Tachikawa | Apr. 8, 1952 |
| 2,592,680 | Goodwin | Apr. 15, 1952 |
| 2,642,950 | Clark et al. | June 23, 1953 |
| 2,647,114 | Torke et al. | July 28, 1953 |
| 2,664,963 | Lovelady et al. | Jan. 5, 1954 |
| 2,680,738 | Laughlin | June 8, 1954 |
| 2,747,002 | Walker et al. | May 22, 1956 |
| 2,757,581 | Freeman et al. | Aug. 7, 1956 |
| 2,787,615 | Weigham | Apr. 2, 1957 |
| 2,816,490 | Boadway et al. | Dec. 17, 1957 |